United States Patent [19]

Niinuma et al.

[11] Patent Number: 4,582,756
[45] Date of Patent: Apr. 15, 1986

[54] ORGANIC MICROBALLOON

[75] Inventors: Kikuo Niinuma; Yoshifumi Morimoto, both of Nara, Japan

[73] Assignee: Matsumoto Yushi-Seiyaku Co., Ltd., Japan

[21] Appl. No.: 630,125

[22] Filed: Jul. 12, 1984

[30] Foreign Application Priority Data

Jul. 12, 1983 [JP] Japan .............................. 58-127384

[51] Int. Cl.[4] .......................... B32B 5/16; B32B 3/26; B05D 7/00
[52] U.S. Cl. .................................. 428/327; 428/403; 428/407; 428/313.3; 428/313.5; 428/480; 428/518; 428/524; 428/520; 427/105; 427/221
[58] Field of Search ............... 428/403, 407, 413, 518, 428/524, 520, 327, 480, 313.3, 313.5; 427/221

[56] References Cited

U.S. PATENT DOCUMENTS

| | | | |
|---|---|---|---|
| 3,700,541 | 10/1972 | Schrimpton et al. | 428/313.5 |
| 3,935,339 | 1/1976 | Cooke, Jr. | 427/4 X |
| 4,156,669 | 5/1979 | Lee | 428/407 X |
| 4,303,736 | 12/1981 | Torobin | 428/403 |
| 4,397,967 | 8/1983 | McDonald | 427/221 X |
| 4,446,208 | 5/1984 | Schwarz | 428/407 |

Primary Examiner—Patrick C. Ives
Attorney, Agent, or Firm—Lawrence Rosen

[57] ABSTRACT

Inorganic fillers such as silica balloons are used as a lightweight filler for resin moldings. But the specific gravity of these inorganic fillers is about 0.2 at most, so that there is a limit to reduction in weight. The foamed product of organic polymers is obtained as a lightweight substance, but it is hardly put to practical use because of its poor solvent resistance and thermal resistance.

The microballoon of the present invention is produced by coating the surface of a hollow particle having the wall film of a thermoplastic high polymer with a thermosetting resin.

The present invention provides a microballoon having excellent solvent resistance and thermal resistance as well as a very low specific gravity, and said microballoon is useful as a lightweight filler for resin moldings, aggregate for FRP, ingredient for paints, and the like.

8 Claims, 1 Drawing Figure

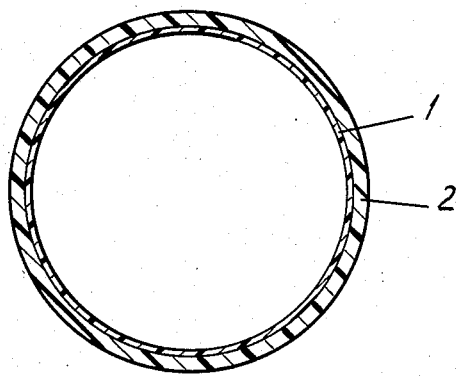

ORGANIC MICROBALLOON

BRIEF DESCRIPTION OF THE DRAWING

The FIGURE shows a typical sectional view of the microballoon of the present invention.

BACKGROUND OF THE INVENTION

It is well known a technique in which inorganic fillers such as silica balloons are used as a lightweight filler for various resin moldings. These inorganic fillers are superior in solvent resistance, thermal resistance, etc., but because of their specific gravity being about 0.2, there is a limit to reduction in weight, and besides they are insufficient in resistance to shear and pressure, buffer action and the like. There are also cases wherein the expandable beads of organic polymers, for example, expandable polystyrene beads, etc., are used as the filler, but because these beads are generally large in particle diameter and markedly inferior in resistance to solvent, heat, pressure, etc., they are generally only regarded as a lightweight aggregate for inorganic structural materials such as cement.

SUMMARY OF THE INVENTION

The present invention relates to an organic microballoon and its production, and according to the present invention, it is possible to freely obtain microballoons having a structure that the hollow particle having the wall film of a thermoplastic high polymer has been coated at the surface with a thermosetting resin, as well as a true specific gravity of 0.01 to 0.03 and an average particle diameter of 1 to 300 micrometer.

The microballoon of the present invention is a light and spherical fine particle superior in solvent resistance and thermal resistance, and by blending it as a filler in resin moldings, lightweight moldings superior in resistance to shear and pressure, buffer action and the like can be obtained. Further, by blending this microballoon with FRP, paint, cement, etc., thick protective layers and structures which are light in weight as well as superior in buffer action can be obtained. Also, the microballoon of the present invention can be applied to the foamed layer of synthetic leather, handling improvers for knitted goods, water/oil-proof wall materials (e.g. wallpaper) and the like.

DETAILED DESCRIPTION OF THE INVENTION

The present invention relates to a microballoon in which, as shown in the FIGURE, the hollow particle having the wall film (1) of the thermoplastic high polymer has been coated at the surface with a thermosetting resin (2). This microballoon is not only useful as a lightweight filler for FRP moldings, but also expected for many other applications.

The hollow particle having the wall film of a thermoplastic high polymer according to the present invention can be obtained by heat-expanding the heat-expansible microcapsule produced, for example, by the method as described in Japanese Patent Publication No. 26524/1967.

The foregoing heat-expansible microcapsule is obtained by covering a volatile liquid with a thermoplastic polymer which will soften at a temperature not less than the gasification temperature of the liquid. As the volatile liquid, there are given low-boiling hydrocarbons such as propane, propylene, butane, isobutane, pentane, isopentane, hexane, heptane, etc., low-boiling organic halogenated compounds such as fluorotrichloromethane, difluorobromomethane, tetrafluorodibromoethane, etc., and the like. These volatile liquids may be used in mixtures of them. Of these liquids, isobutane, butane and hexane are particularly preferred for the reason that hollow particles of low specific gravity are easily obtained by heating the heat-expansible microcapsule, and that production of the heat-expansible microcapsule is easy. The content of the volatile liquid in the heat-expansible microcapsule is preferably 3 to 50%, and a content of 5 to 30% is particularly preferred to obtain hollow particles of low specific gravity with ease.

The thermoplastic resin used for covering the volatile liquid may be any of the resins obtained by polymerizing the monomers having a polymerizable unsaturated bond described in the foregoing Japanese Patent Publication No. 26524/1967. But, for obtaining hollow particles of low specific gravity with ease, resins obtained by copolymerization of vinylidene chloride-acrylonitrile, vinylidene chloride-acrylonitrile-methyl acrylate, vinylidene chloride-acrylonitrile-ethyl acrylate, vinylidene chloride-acrylonitrile-methyl methacrylate, vinylidene chloride-acrylonitrile-vinyl acetate, vinylidene chloride-methyl methacrylate, acrylonitrile-methyl methacrylate, acrylonitrile-vinyl acetate and the like are particularly preferred.

The particle diameter of the heat-expansible microcapsule can optionally be regulated within a range of 0.1 to 200 micrometer at a step wherein a mixture of the volatile liquid and the monomer is dispersed in an aqueous phase before polymerization. But, a particle diameter of 1 to 50 micrometer is preferred to obtain hollow particles of low specific gravity with ease.

The heat-expansible microcapsule thus obtained is heat-expanded to obtain the hollow particle of low specific gravity. A method to obtain the hollow particle is not particularly limited, and any of methods using normal-pressure or pressurized steam, hot air flow, warm water or the like may be employed if sufficient expansion of the heat-expansible microcapsule can be achieved. For example, a method in which an aqueous dispersion liquid of the heat-expansible microcapsule is forced into a pipe through which pressurized steam of 0.2 to 2 Kg/cm$^2$ (G) is flowing and allowed to stay for 0.1 to 1.0 second, or a method in which the dry powder of the heat-expansible microcapsule is left as it is for 10 to 240 seconds in a hot air flow of 120° C. to 150° C., may be employed. Alternatively, a method may be employed in which an aqueous dispersion liquid of the heat-expansible microcapsule is poured into a stirred hot water of 70° C. to 95° C. and stirring is continued for further 1 to 10 minutes. By these methods, hollow particles containing no welded particles and having a specific gravity of 0.01 at the lowest are obtained. The average particle diameter of the hollow particle at that time is generally 70 to 100 micrometer when the heat-expansible microcapsule of 15 to 20 micrometer in average particle diameter is used.

The hollow particle thus obtained is then coated at the surface with a thermosetting resin. Specific examples of a preferred thermosetting resin include, for example, melamine/formaldehyde resins, urea/formaldehyde resins, phenol/formaldehyde resins, epoxy resins and the like.

When melamine/formaldehyde resins, urea/formaldehyde resins and phenol/formaldehyde resins are used, surface-coated microballoons are obtained by adding the required amounts of the thermosetting resin and a catalyst (hardening agent) to an aqueous dispersion liquid of the hollow particle at a temperature not more than 90° C. with stirring, forming the coating film of the resin on the surface of the hollow particle while hardening the resin and then completing the hardening at a temperature not more than 90° C. at which the hollow particle is not broken. The catalyst is not particularly limited, but it suffices to use acids such as hydrochloric acid, sulfuric acid, nitric acid, etc., or inorganic salts showing acidity in aqueous solution such as aluminium sulfate, alum (ammonium aluminium sulfate), etc. The formed surface-coated microballoon is separated by centrifugal or vacuum filtration, and the wet cake obtained is then treated, if necessary, with a hot air flow, etc. to obtain a dried product.

When epoxy resins are used, the surface-coated microballoon is obtained by dispersing the dried hollow particle (water content, not more than 2%) in an organic solvent not attacking the particle (e.g. toluene, xylene), adding to the resulting dispersion liquid the required amounts of the epoxy resin and an amine type hardening agent such as diethylenetriamine, hexamethylenetetramine or the like (the hardening agent is not particularly limited to said amine type ones) with stirring, forming the coating film of the resin on the surface of the particle while hardening the resin and then completing the hardening at a temperature not more than 90° C. at which the hollow particle is not broken. The formed surface-coated microballoon is filtered off to recover the organic solvent and if necessary, treated with a hot air flow, etc. to obtain a dried product.

A thermosetting resin which is particularly preferred to the object of the present invention is initial condensation resins of trimethylolmelamine or methylolphenol, high condensation resins of methylolurea, epoxy resins and the like.

These thermosetting resins are generally used in amounts of 5 to 2000 parts by weight, preferably 10 to 500 parts by weight based on 100 parts by weight of the hollow particle.

The specific gravity of the surface-coated microballoon, as produced, for example, by surface-coating 100 parts by weight ( as dry weight) of the hollow particle having a specific gracvity of 0.020 with 100 parts by weight (as dry weight) of the foregoing thermosetting resin, is 0.041 when said thermosetting resin is melamine/formaldehyde resins; 0.035 when said resin is urea/-formaldehyde resins; 0.031 when said resin is phenol/-formaldehyde resins; and 0.039 when said resin is epoxy resins.

The microballoon obtained according to the present invention has a high solvent resistance and besides can be added to molten resins at high temperatures, so that it can be used in various applications, for example, in weight reduction for moldings, the foamed layer of synthetic leather, handling improvement for knitted goods and the like.

The present invention will be illustrated with reference to the following examples.

All parts and percents in the examples are by weight unless otherwise stated.

EXAMPLE 1

An oily phase comprising 70 parts of acrylonitrile, 120 parts of vinylidene chloride, 10 parts of methyl acrylate, 0.5 part of divinylbenzene, 2 parts of diisopropyl peroxydicarbonate and 35 parts of isobutane was prepared.

A mixture comprising 400 parts of deionized water, 20 parts of a colloidal silica dispersion liquid (solid content, 20%), 2 parts of 2.5% aqueous potassium perchromate solution and 1.5 parts of 50% aqueous solution of diethanolamine/adipic acid condensate was prepared, and its pH was adjusted to 3.5 with hydrochloric acid to prepare an aqueous phase.

Subsequently, the oily and aqueous phases were mixed for 90 seconds at 6000 rpm, added to a nitrogen-replaced 1.5-liter polymerization pressure-reactor and reacted at 50° C. for 20 hours at a pressure of 3.5 to 4.5 kg/cm$^2$. The product thus obtained was pale yellow dispersion liquid having a viscosity of 210 cps at room temperature and containing heat-expansible microcapsules of 15 to 20 micrometer in average particle diameter. This liquid was passed through a 200-mesh net to remove coarse beads and coarse polymers, and 70 parts of sodium chloride, a modifier for the thermoplastic polymer constituting the shell of the heat-expansible microcapsule, was added to and completely dissolved in the liquid which was then allowed to stand for 24 hours.

Thereafter, the dispersion liquid of the heat-expansible microcapsule was added in one portion to 100 liters of a stirred hot water of 80° C., and the mixture was stirred for 2 minutes to complete heat expansion, cooled by adding 50 100 liters of cold water thereto and freed of water by centrifugal dehydration to obtain hollow particle of 60 to 80 micrometer in average particle diameter having a water content of 50%. This particle was dried and measured for specific gravity to find that it was 0.020.

Next, a dispersion liquid comprising 2000 parts of a deionized water, 50 parts of the hollow particle (specific gravity, 0.020) having a water content of 50%, 25 parts (as a solid content) of a nonionic methoxymethylolmelamine (Eulamine P-6100; produced by Mitui Toatsu Chemicals, Inc.) and 50 parts of a 5% aqueous sulfiric acid solution was prepared, heated to 60° C. with stirring and aged at this temperature for 4 hours to form a uniform coating film of the methoxymethylolmelamine on the surface of the hollow particle while hardening the resin. After completion of the reaction, the reaction mixture was cooled and freed of water by centrifugal dehydration to obtain a melamine/formaldehyde resin-surface coated microballoon having a water content of 50%. this microballoon was left as it was in a hot air flow of 80° C. to 100° C. to obtain a dried product. The specific gravity of this dried product was measured to find that it was 0.041. This value shows that the specific gravity increased by the amount of the melamine/formaldehyde resin used for coating.

This dried melamine/formaldehyde resin-surface coated microballoon was used in reducing the weight of polyester resin moldings. For the test, two sols (A) and (B) prepared as described below were each mixed with 1 part of methyl ethyl ketone peroxide (hardening agent), casted and hardened at room temperature to obtain a molded product.

Sol (A): 100 parts of an unsaturated polyester resin containing 35% of a styrene monomer (Rigolak 157 BQT-2; produced by Showa Highpolymer Co., Ltd.)

and 2 parts of the melamine/folmaldehyde resin-surface coated microballoon were mixed at room temperature for 3 hours while removing bubbles at a reduced pressure of 35 mmHg.

Sol (B): 100 parts of the same unsaturated polyester resin as above and 2 parts of the surface-uncoated blank hollow particle (specific gravity, 0.020) were mixed at room temperature for 3 hours while removing bubbles at a reduced pressure of 35 mmHg.

The molded product obtained with the surface-uncoated blank hollow particle showed a density of 1.10 g/cm$^3$ because most of the hollow particles contained in it were broken by a relative increase in the pressure of the remaining gas in the hollow particles under a reduced pressure of 35 mmHg and swelling of the thermoplastic polymer shell by the action of the styrene monomer. This density is not so much different from the density, 1.18 g/cm$^3$, of a molded product produced by hardening the unsaturated polyester resin alone, which means that the weight reduction was not attained sufficiently. While, the molded product obtained with the melamine/formaldehyde resin-surface coated microballoon became light in weight, as shown by a density of 0.85 g/cm$^3$, with the hollow particles in it being not broken at all under a reduced pressure of 35 mmHg, which means that sufficient weight reduction was attained. Also, from the scanning electron microscopic observation of the sections of the molded products, it was confirmed that the molded product obtained with the blank hollow particles had them almost broken although those having an average particle diameter of not more than 25 micrometer remained in places, while that, with the molded product obtained with the melamine/formaldehyde resin surface-coated microballoon, the hollow particles contained in it were not broken at all, maintaining an average particle diameter of 60 to 80 micrometer.

Next, the foregoing dried melamine/formaldehyde resin-surface coated microballoon was applied to a polyvinyl chloride resin. Two sols prepared as described below were each coated onto woven fabrics and heat-treated under a condition of 200° C.×5 minutes to prepare a sheet.

One sol: Prepared by mixing 100 parts of polyvinyl chloride resin (Sumilit PXNL; produced by Sumitomo Chemical Co.), 60 parts of DOP and 2 parts of the surface-uncoated blank hollow particle (specific gravity, 0.020).

Another sol: Prepared by mixing 100 parts of the same polyvinyl chloride resin as above, 60 parts of DOP and 2 parts of the melamine/formaldehyde resin-surface coated microballoon.

The sheet obtained with the surface-uncoated blank hollow particles showed a density of 1.35 g/cm$^3$ because the hollow particles contained in it were plasticized and swollen by the action of DOP and at the same time, completely broken by the heat evolved at 200° C. This density is the same as that of a sheet obtained without adding the hollow particle, which means that the effect of addition of the hollow particle was not noticed at all. While, with the sheet obtained with the melamine/formaldehyde resin-surface coated microballoon, the microballoon was not plasticized by DOP and showed a chemical and thermal resistance enough to resist a condition of 200° C.×5 minutes. And, the sheet had a low density of 0.80 g/cm$^3$ and a good handling like leather as well as good tensile strength and peeling strength. also, from the scanning electron microscopic observation of the sections of the sheets, it was confirmed that the sheet obtained with the blank hollow particles had them completely broken, while that, with the sheet obtained with the surface-coated microballoon, the hollow particles contained in it were not broken at all, maintaining an average particle diameter of 60 to 80 micrometer.

Two kinds of polyvinyl chloride resin sol prepared in completely the same manner as above were molded on an injection molding machine. This injection molding was carried out with the cylinder temperature set at 175° C. As a result, the molded product obtained with the surface-uncoated bland hollow particles showed a density of 1.35 g/cm$^3$ because the hollow particles contained in it were plasticized and swollen by the action of DOP and at the same time, completely broken by the heat in the cylinder. This density is the same as that of the molded product obtained without adding the hollow particles, which means that the effect of the hollow particle as a weight lightening agent was not observed at all. While, with molded product obtained with the surface-coated microballoon, the microballoon was not plasticized nor swollen by DOP and should a chemical and thermal resistance enough to resist heat in the cylinder. And, the molded product had a low density of 0.80 g/cm$^3$ and could be used in weight reduction. Also, from the scanning electron microscopic observation of the sections of the molded products, it was also confirmed that the molded product obtained with the blank hollow particles had them completely broken, while that, with the molded product obtained with the surface-coated microballoon, the hollow particles contained in it were not broken at all, maintaining an average particle diameter of 60 to 80 micrometer.

EXAMPLE 2

A heat-expansible microcapsule was prepared in the same manner as in Example 1, and heat-expanded in a hot water of 85° C. to obtain a hollow particle 0.020 in specific gravity having a water content of 50%.

A dispersion liquid comprising 2000 parts of deionized water, 50 parts of the hollow particle (true specific gravity, 0.020) having a water content of 50%, 25 parts (as a solid content) of a cationic modified urea resin (Eulamine P-1500; produced by Mitsui Toatsu Chemicals, Inc.) and 3 parts of aluminum sulfate was prepared, heated to 60° C. with stirring and aged at this temperature for 4 hours to form a uniform coating film of the urea/fomaldehyde resin on the surface of the hollow particle while hardening the resin. After completion of the reaction, the reaction mixture was cooled and freed of water by centrifugal dehydration to obtain a urea/formaldehyde resin-surface coated microballoon having a water content of 50%. This microballoon was heat-treated with a hot air flow of 80° C. to 90° C. to obtain a dried product. The specific gravity of this dried product was measured to find that it was 0.035. This value shows that the specific gravity increased by the amount of the urea/formaldehyde resin used for coating.

In the same manner as in Example 1, this dried urea/formaldehyde resin-surface coated microballoon was used in weight reduction for the polyester resin moldings, weight reduction and modification for the polyvinyl chloride resin sheets and weight reduction for the polyvinyl chloride resin moldings. As a result, it was found that these resin products showed a good chemical and thermal resistance, demonstrating the effect of addition of this surface-coated microballoon.

EXAMPLE 3

A heat-expansible microcapsule was prepared in the same manner as in Example 1, and heat-expanded in a hot water of 85° C. to obtain a hollow particle of 0.020 in true specific gravity having a water content of 50%.

A dispersion liquid comprising 2000 parts of deionized water, 50 parts of the hollow particle (true specific gravity, 0.020) having a water content of 50%, 25 parts (as a solid content) of a water-soluble phenol/ formaldehyde resin (U-Loid PL-266; produced by Mitsui Toatsu Chemicals, Inc.) and 8 parts of 35% hydrochloric acid was prepared, heated to 60° C. with stirring and aged at this temperature for 4 hours to form a uniform coating film of the phnol/formaldehyde resin on the surface of the hollow particle while hardening the resin. After completion of the reaction, the reaction mixture was cooled and freed of water by centrifugal dehydration to obtain a phenol/formaldehyde resin-surface coated microballoon having a water content of 50%. This microballoon was treated with a hot air flow of 80° C. to 100° C. to obtain a dried product. The specific gravity of this dried phenol/formaldehyde resin-surface coated microballoon was measured to find that it was 0.031. This value shows that the specific gravity increased by the amount of the phenol/formaldehyde resin used for coating.

In the same manner as in Example 1, this dried phenol/formaldehyde resin-surface coated microballoon was used in weight reduction for the polyester resin moldings, weight reduction and modification for the polyvinyl coloride resin sheets and weight reduction for the polyvinyl chloride resin moldings. As a result, it was found that these resin products showed a good chemical and thermal resistance, demonstrating the effect of addition of this surface-coated microballoon.

EXAMPLE 4

A heat-expansible microcapsule was prepared in the same manner as in Example 1, and heat-expanded in a hot water of 85° C. to obtain a hollow particle of 0.020 in specific gravity having a water content of 50%. This particle was treated with a hot air flow of 40° C. to obtain a dried product.

A dispersion liquid comprising 2000 parts of xylene, 25 parts of the dried hollow particle (true specific gravity, 0.020) and 25 parts of an epoxy resin (Epicoat 828; produced by Shell Kagakuhin Co.) was prepared, and 2.5 parts of diethylenetriamine was added with stirring. The dispersion liquid was then heated to 50° C. and aged at this temperature for 4 hours to form a uniform coating film of the epoxy resin on the surface of the hollow particle while hardening the resin. after completion of the reaction, the reaction mixture was cooled and filtered to obtain an epoxy resin-surface coated microballoon containing 40% of xylene. This microballoon was treated with a hot air flow of 80° C. to obtain a dried product. The specific gravity of the dried product was measured to find that it was 0.039. This value shows that the specific gravity increased by the amount of the epoxy resin used for coating.

In the same manner as in Example 1, this dried epoxy resin-surface coated microballoon was used in weight reduction for the polyester resin moldings, weight reduction and modification for the polyvinyl chloride resin sheets and weight reduction for the polyvinyl chloride resin moldings. As a result, it was found that these resin products showed a good chemical and thermal resistance, demonstrating the effect of addition of this surface-coated microballoon.

EXAMPLE 5

In the same manner as in Example 1 was prepared a dispersion liquid of heat-expansible microcapsules of which shell made of a thermoplastic polymer was modified with sodium chloride.

Thereafter, this dispersion liquid was poured in one portion into 100 liters of a stirred hot water of 80° C. and stirred for 2 minutes, whereby the heat-expansible microcapsule was heat-expanded into hollow particles. A part of this dispersion liquid of the hollow particle was sampled, dehydrated and dried. The specific gravity of this dried product was measured to find that it was 0.020. Subsequently to the above 2 minutes' heat-expansion, 235 parts (as a solid content) of trimethylolmelamine (Sumitex Resin M-3; produced by Sumitomo Chemical Co.) and then 470 parts of a 5% aqueous sulfuric acid solution were added to the dispersion liquid. The liquid was then aged for 30 minutes at 80° C. to 85° C. to form a uniform coating film of trimethylolmelamine on the surface of the hollow particle while hardening the resin. After completion of the reaction, the reaction mixture was cooled and freed of water by centrifugal dehydration to obtain a melamine/formaldehyde resin-surface coated microballoon having a water content of 50%. This microballoon was treated with a hot air flow of 80° C. to 90° C. to obtain a dried product. The specific gravity of this dried product was measured to find that it was 0.041. This value shows that the specific gravity increased by the amount of the melamine/formaldehyde resin used for coating. In the same manner as in Example 1, this dried melamine/formaldehyde resin-surface coated microballoon was used in weight reduction for the polyester resin moldings, weight reduction and modification for the polyvinyl chloride resin sheets and weight reduction for the polyvinyl chloride resin moldings. As a result, it was found that these resin products showed a good chemical and thermal resistance, demonstrating the effect of addition of this surface-coated microballoon.

EXAMPLE 6

The thermal resistance and solvent resistance of the melamine/formaldehyde resin-surface coated microballoon obtained in Example 1 and the surface-uncoated hollow particle were evaluated.

Table 1 shows the appearance, specific gravity and particle diameter of these test samples before and after 24 hours' treatment in a stirred hot water of 80° C. Table 2 shows the same items before and after 10 minutes' treatment in a hot air flow of 180° C.

TABLE 1

| Sample | Appearance Before acceleration test | Appearance After acceleration test | Specific gravity Before acceleration test | Specific gravity After acceleration test | Average particle diameter (μm) Before acceleration test | Average particle diameter (μm) After acceleration test |
|---|---|---|---|---|---|---|
| Hollow Particle (blank) | Separate hollow particle | Sphere of 2 to 5 mm in diameter* | 0.020 | 0.265 | 60-80 | Not measurable* |
| Surface-coated hollow particle (microballoon) | Separate hollow particle | Separate hollow particle | 0.041 | 0.070 | 60-80 | 50-70 |

*The hollow particle was broken and welded by heat.

TABLE 2

| Sample | Appearance Before acceleration test | Appearance After acceleration test | Specific gravity Before acceleration test | Specific gravity After acceleration test | Average particle diameter (μm) Before acceleration test | Average particle diameter (μm) After acceleration test |
|---|---|---|---|---|---|---|
| Hollow Particle (blank) | Separate hollow particle | Initial shape was not noticed.* | 0.020 | 0.582 | 60-80 | Not measurable* |
| Surface-coated hollow particle (microballoon) | Separate hollow particle | Separate hollow particle | 0.041 | 0.046 | 60-80 | 60-80 |

*The hollow particle was broken and welded by heat.

Table 3 shows the chemical resistance of the microballoon of the present invention and the blank hollow particle when each test sample was dipped in various solvents at 40° C. for 10 days.

TABLE 3

| Chemicals | Blank hollow particle (specific gravity 0.020) Evaluation | Blank hollow particle Specific gravity after dipping | Surface-coated microballoon (specific gravity, 0.041) Evaluation | Surface-coated microballoon Specific gravity after dipping |
|---|---|---|---|---|
| Benzene | x | 0.193 | o | 0.051 |
| Toluene | o | 0.043 | o | 0.045 |
| Xylene | o | 0.028 | o | 0.041 |
| Methanol | x | 0.435 | Δ | 0.083 |
| Ethanol | x | 0.274 | o | 0.057 |
| Isopropanol | o | 0.031 | o | 0.048 |
| Butanol | o | 0.025 | o | 0.044 |
| n-Hexane | o | 0.021 | o | 0.041 |
| Cyclohexane | o | 0.024 | o | 0.041 |
| Perchloroethylene | o | 0.025 | o | 0.041 |
| Ethyl acetate | x | Not measurable* | Δ | 0.079 |
| Dioctyl phthalate | x | Not measurable* | o | 0.049 |
| Acetone | x | Not measurable* | Δ | 0.064 |
| Methyl ethyl ketone | x | Not measurable* | Δ | 0.060 |
| Methyl isobutyl ketone | x | Not measurable* | Δ | 0.060 |
| Styrene | x | 0.357 | o | 0.047 |

*The shell of the hollow particle made of a thermoplastic polymer was swollen by and dissolved in the solvents, so that the hollow particle could not be recovered from the solvent.

What is claimed is:

1. A microballoon comprising a hollow particle having a wall film of a thermoplastic high polymer and a second wall film of a thermosetting resin on the thermoplastic high polymer wall film.

2. A microballoon as described in claim 1 having a true specific gravity of 0.01 to 0.30 and a particle size of 1 to 300 micrometer.

3. A microballoon as described in claim 1, wherein the thermoplastic high polymer is selected from the group consisting of a vinylidene chloride-acrylonitrile, vinylindene chloride-acrylonitrile-methyl acrylate, vinylidene chloride-acrylonitrile-ethyl acrylate, vinylidene chloride-acrylonitrile-methyl methacrylate, vinylidene chloride-acrylonitrile-vinyl acetate, vinylidene chloride-methyl methacrylate, acrylonitrile-methyl methacrylate and acrylonitrile-vinyl acetate copolymer resins.

4. A microballoon as described in claim 1, wherein the thermosetting resin is selected from the group consisting of a melamine/formaldehyde, phenol/formaldehyde, urea/formaldehyde and epoxy resins.

5. A microballoon as described in claim 2, wherein the thermosetting resin is a melamine/formaldehyde.

6. A microballoon as described in claim 2, wherein the thermosetting resin is a phenol/formaldehyde.

7. A microballoon as described in claim 2, wherein the thermosetting resin is a urea/formaldehyde.

8. A microballoon as described in claim 2, wherein the thermosetting resin is epoxy.

* * * * *